(12) United States Patent
Sasscer et al.

(10) Patent No.: US 9,511,875 B2
(45) Date of Patent: Dec. 6, 2016

(54) ELECTROMECHANICAL ACTUATOR DAMPING ARRANGEMENT FOR RAM AIR TURBINE

(75) Inventors: Gary Sasscer, Leaf River, IL (US); Richard Schweighart, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1182 days.

(21) Appl. No.: 13/490,079

(22) Filed: Jun. 6, 2012

(65) Prior Publication Data

US 2013/0327207 A1 Dec. 12, 2013

(51) Int. Cl.
*B64D 41/00* (2006.01)

(52) U.S. Cl.
CPC .................. *B64D 41/007* (2013.01)

(58) Field of Classification Search
CPC .......... F16F 9/49; F15B 15/222; B64D 41/007
See application file for complete search history.

(56) References Cited

U.S. PATENT DOCUMENTS

| | | | |
|---|---|---|---|
| 3,176,972 A * | 4/1965 | Deschner | 267/127 |
| 3,677,141 A | 7/1972 | Lagerqvist et al. | |
| 3,974,910 A | 8/1976 | Papai | |
| 4,585,213 A * | 4/1986 | Slagle et al. | 254/388 |
| 4,676,458 A * | 6/1987 | Cohen | 244/58 |
| 8,070,094 B2 | 12/2011 | Collins | |
| 8,123,161 B1 | 2/2012 | Collins | |
| 2002/0166446 A1* | 11/2002 | Chen | 92/85 B |
| 2009/0309278 A1* | 12/2009 | Axelsson et al. | 267/64.26 |

FOREIGN PATENT DOCUMENTS

| | | |
|---|---|---|
| CN | 2616748 Y | 5/2004 |
| CN | 2874129 | 2/2007 |
| CN | 201198853 | 2/2009 |
| DE | 2344693 | 3/1975 |
| DE | 3924166 C1 | 2/1991 |
| GB | 726327 | 3/1955 |

\* cited by examiner

*Primary Examiner* — Michael Leslie
*Assistant Examiner* — Michael Quandt
(74) *Attorney, Agent, or Firm* — Carlson, Gaskey & Olds, P.C.

(57) ABSTRACT

A ram air turbine actuator includes a piston rod arranged in a cylinder. The cylinder and piston rod are configured to move longitudinally relative to one another between retracted and deployed positions. An annular space provided between the cylinder and piston rod, and a fluid flow regulating feature is provided in the piston rod. The fluid flow regulating feature is progressively blocked from the retracted position to the deployed position. The RAT actuator is deployed by initiating a deploy sequence and reducing a volume of an annular space. Fluid flow is forced from the annular space through a flow regulating feature to a cavity. The size of the flow regulating feature reduces to damp the actuator during the deploy sequence.

13 Claims, 3 Drawing Sheets

ELECTROMECHANICAL ACTUATOR DAMPING ARRANGEMENT FOR RAM AIR TURBINE

BACKGROUND

This disclosure relates to an electromechanical actuator damping system used for a ram air turbine (RAT), for example.

A typical hydraulic RAT actuator includes a piston rod slideably movable relative to a cylinder during deployment. Hydraulic fluid typically fills the piston rod and the cylinder to prevent the creation of a vacuum. Down-lock wedges prevent the actuator from being forced to compress. The actuator is under great stress during deployment, in particular, when the actuator is at the end of its travel.

SUMMARY

A ram air turbine actuator includes a piston rod arranged in a cylinder. The cylinder and piston rod are configured to move longitudinally relative to one another between retracted and deployed positions. An annular space provided between the cylinder and piston rod, and a fluid flow regulating feature is provided in the piston rod. The fluid flow regulating feature is progressively blocked from the retracted position to the deployed position.

The RAT actuator is deployed by initiating a deploy sequence and reducing a volume of an annular space. Fluid flow is forced from the annular space through a flow regulating feature to a cavity. The size of the flow regulating feature reduces to slow the actuator's extension during the deploy sequence.

BRIEF DESCRIPTION OF THE DRAWINGS

The disclosure can be further understood by reference to the following detailed description when considered in connection with the accompanying drawings wherein.

DETAILED DESCRIPTION

Figure 1:
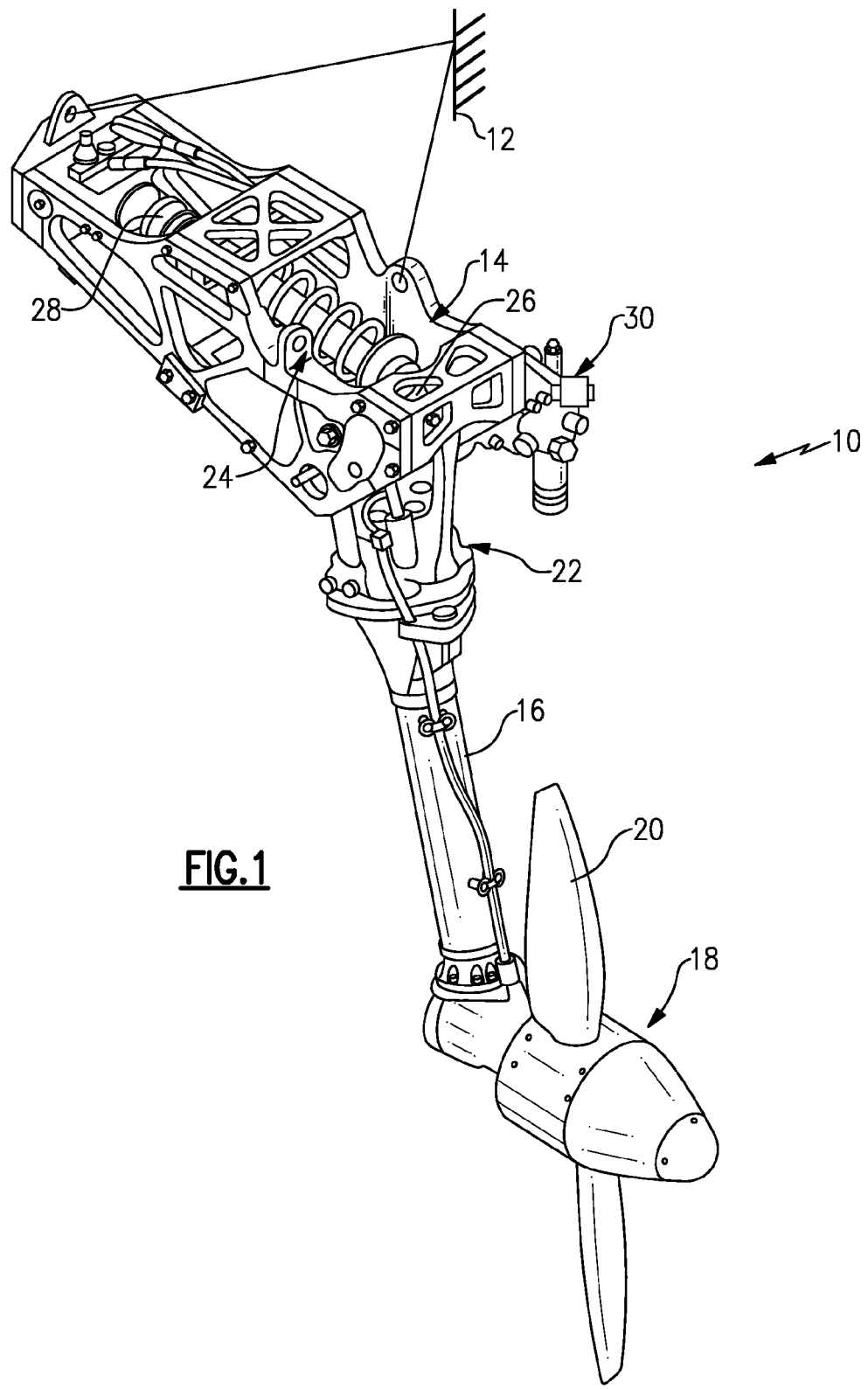
FIG. 1 is a perspective view of a RAT system in a deployed position.

FIG. 1 illustrates a RAT system 10 secured to an aircraft structure 12 by a housing 14. The housing 14 pivotally supports a strut 16 having a turbine 18 at one end. The turbine 18 includes blades 20, which impart rotational drive to a generator 22 and a hydraulic pump 30, for example. An actuator 24 is secured to the strut 16 at a first end 26 and to the housing at a second end 28. The actuator 24 is illustrated in its deployed position.

Figure 2:
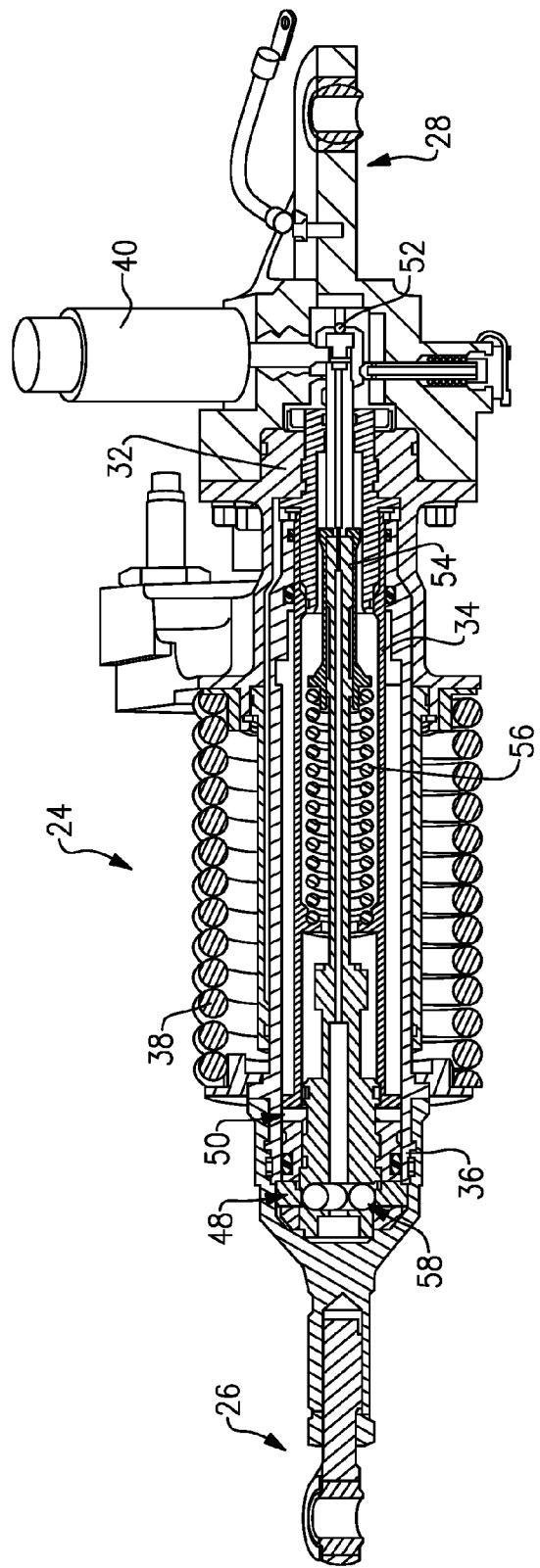
FIG. 2 is a cross-sectional view of an actuator illustrated in FIG. 2, but in a retracted position.

Referring to FIG. 2, the actuator 24 includes a housing 32 having a piston rod 34 and a cylinder 36, unattached to housing 32, telescopically arranged relative to one another. A deploy spring 38 is arranged between the housing 32 and the cylinder 36 in a compressed state with the actuator 24 in its retracted position, shown in FIG. 2. The piston rod 34 is affixed to the housing 32, and the cylinder 36 is arranged to slide over the piston rod 34.

The piston rod 34 supports up-lock and down-lock wedges 48, 50. A latch assembly 52 is provided in the housing 32 near a deploy solenoid 40 that is mounted on the housing 32. A lock bolt 54 is arranged slideably within the piston rod 34 to actuate up-lock and down-lock wedges 48, 50 during the deploy sequence. A roller assembly 58 is supported by the lock bolt 54 and arranged radially inward from the up-lock wedges 48.

The deploy solenoid 40 is actuated to initiate a deploy sequence within the actuator 24. In operation, to initiate the deploy sequence, the deploy solenoid 40 releases the latch assembly 52. The lock bolt 54 is forced to move axially to the right in FIG. 2 by a lock bolt spring 56 arranged between the piston rod 34 and the lock bolt 54. The roller assembly 58 permits the up-lock wedges 48 to move radially inward and disengage from the end of the cylinder 36. The deploy spring 38 is then able to urge the cylinder 36 axially relative to and away from the housing 32 to the deployed position shown in FIGS. 1 and 4. The down-lock wedges 50 prevents forced retraction of the cylinder 36 relative to the piston rod 34.

Figure 5:
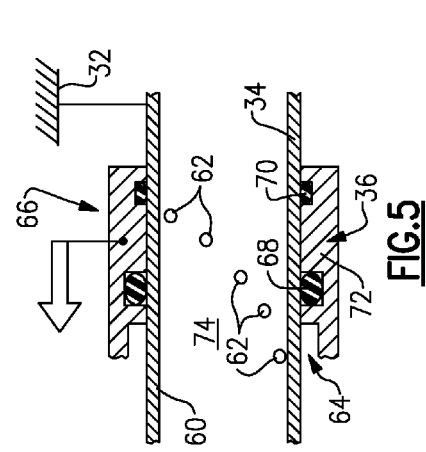
FIG. 5 is a cross-sectional view of another end of the piston rod.
Figure 3:
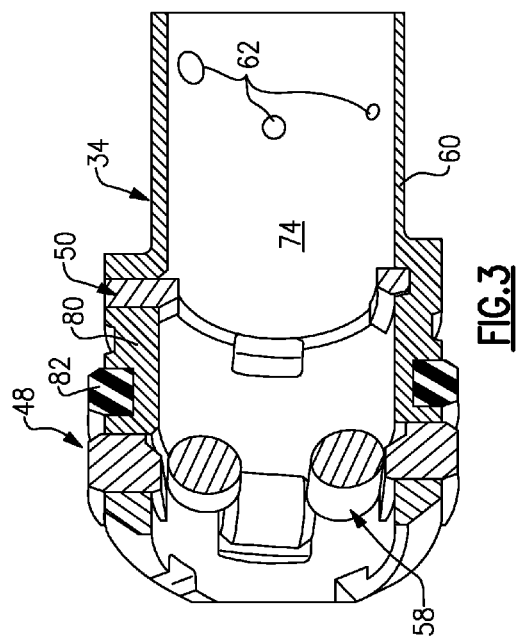
FIG. 3 is perspective view of one end of a piston rod.
Figure 4:
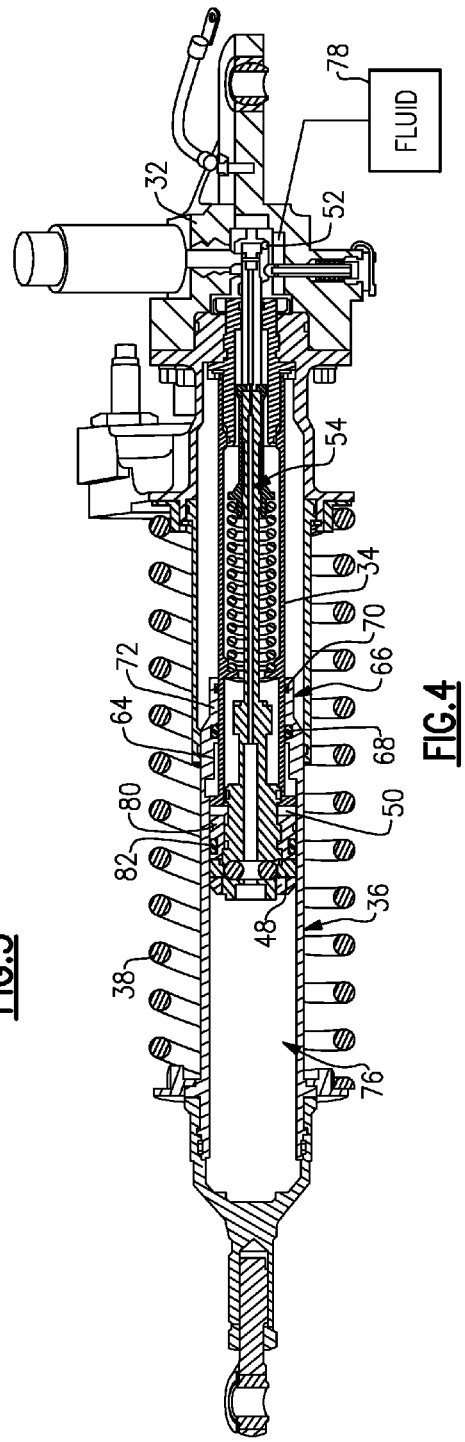
FIG. 4 is a cross-sectional view of the actuator in a deployed position.

An annular space 64 is provided between a cylindrical wall 60 of the piston rod 34 and the cylinder 36, best shown in FIG. 4. Referring to FIGS. 3 and 5, the piston rod 34 provides an interior cavity 74. The wall 60 includes a fluid flow regulating feature, which is provided by multiple, longitudinally spaced orifices 62 in one example. The orifices 62 may be of different sizes, if desired. For example, the orifices 62 are progressively smaller, with the larger orifices becoming blocked first during deployment. The orifices are arranged in a circular array such that no two orifices are aligned axially. This is to reduce wear of the seals that pass over them. Axial spacing of the orifices is critical to timing the damping function with the rotational deployment of the RAT, allowing the RAT to deploy in a timely fashion while timing the maximum damping function to coincide with the high stopping forces experienced as the actuator contacts it's hard stops.

Referring to FIGS. 4 and 5, the cylinder 36 includes an end 66 supporting first and second seals 68, 70 that are longitudinally spaced from one another. The piston rod 34 includes an end 80 that supports a third seal 82, as shown in FIGS. 3 and 4. In this manner, annular space 64 provides a variable, sealed volume, the size of which decreases as the cylinder 36 slides from the retracted position (FIG. 2) to the deployed position (FIG. 4). The end 66 gradually blocks the orifices 62 to reduce the fluid flow through the wall 60, increasing fluid pressure in annular space 64. In one example shown in FIG. 5, one or more orifices 62 are blocked by the first seal 68 and arranged between the first and second seals 70. The blockage of the orifices 62 progressively restricts fluid flow from the annular space 64 into the cavity 74 increasing it's internal pressure in a timed, stepwise fashion, thereby slowing axial travel of the cylinder 36 so that it does not cease motion abruptly and violently as the cylinder 36 reaches a fully deployed position.

A pressurized fluid source 78 is in fluid communication with the cavity 74. As a volume 76 within the cylinder 36 increases during deployment, fluid is provided to the cavity 74 from the aircraft return port and the pressurized fluid source 78.

Although an example embodiment has been disclosed, a worker of ordinary skill in this art would recognize that certain modifications would come within the scope of the claims. For that reason, the following claims should be studied to determine their true scope and content.

What is claimed is:

1. An actuator for a ram air turbine comprising:
   a cylinder;
   a piston rod arranged in the cylinder and configured to move longitudinally relative thereto between retracted and deployed positions, an annular space provided between the cylinder and piston rod, and a fluid flow regulating feature provided in the piston rod and configured to be progressively blocked from the retracted position to the deployed position;
   up-lock and down-lock wedges supported on the piston rod;
   a lock bolt supporting a roller assembly and arranged slidably within the piston rod and configured to disengage the up-lock wedges and release the piston rod from the cylinder; and
   wherein the fluid flow regulating feature is configured to progressively restrict fluid flow from the annular space to a cavity to slow axial travel of the cylinder with respect to the piston rod prior to the down-lock wedges preventing forced retraction of the cylinder relative to the piston rod.

2. The actuator according to claim 1, wherein the piston rod includes a cylindrical wall adjacent to the annular space, and the fluid flow regulating feature is provided in the cylindrical wall and is configured to regulate a flow rate of fluid from the annular space to a cavity within the piston rod.

3. The actuator according to claim 2, wherein the fluid flow regulating feature is provided by multiple discrete orifices spaced longitudinally relative to one another.

4. The actuator according to claim 3, wherein the orifices are different sizes.

5. The actuator according to claim 1, wherein the cylinder includes a cylinder end that is configured to block the fluid flow regulating feature.

6. The actuator according to claim 5, wherein the cylinder end supports a first seal configured to block the fluid flow regulating feature.

7. The actuator according to claim 6, wherein the cylinder end supports a second seal spaced longitudinally from the first seal, at least a portion of the fluid flow regulating feature configured to be arranged between the first and second seals in the deployed position.

8. The actuator according to claim 6, wherein the piston rod includes a piston end supporting a third seal, the annular space between the first and third seals, the annular space configured to reduce in size from the retracted position to the deployed position.

9. A method of deploying a RAT actuator comprising a cylinder, a piston rod arranged in the cylinder and configured to move longitudinally relative thereto between retracted and deployed position, an annular space provided between the cylinder and piston rod, and a fluid flow regulating feature provided in the piston rod and configured to be progressively blocked from the retracted position to the deployed position, up-lock and down-lock wedges supported on the piston rod, a lock bolt supporting a roller assembly and arranged slidably within the piston rod and configured to disengage the up-lock wedges and release the piston rod from the cylinder, wherein the fluid flow regulating feature is configured to progressively restrict fluid flow from the annular space to cavity to slow axial travel of the cylinder with respect to the piston rod prior to the down-lock wedeges preventing forced retraction of the cylinder relative to the piston rod, the method comprising the steps of:
   initiating a deploy sequence;
   reducing a volume of the annular space;
   forcing fluid flow from the annular space through the fluid flow regulating feature to the cavity; and
   reducing the size of the fluid flow regulating feature to damp the actuator during the deploy sequence.

10. The method according to claim 9, wherein the reducing step includes sliding a piston rod relative to a cylinder, the annular space provided radially between the cylinder and piston rod.

11. The method according to claim 10, wherein the reducing step includes decreasing the volume provided between seals arranged radially between the cylinder and piston rod.

12. The method according to claim 10, wherein the fluid flow regulating feature includes multiple discrete orifices longitudinally spaced from one another.

13. The method according to claim 12, wherein the reducing step includes sequentially blocking the orifices during the reducing step.

* * * * *